United States Patent
Haenel

(10) Patent No.: US 10,208,691 B2
(45) Date of Patent: Feb. 19, 2019

(54) SYSTEM AND PROCESS FOR PREDICTING AND PREVENTING PRE-IGNITION

(71) Applicant: FEV GmbH, Aachen (DE)

(72) Inventor: Patrick Haenel, Rochester, MI (US)

(73) Assignee: FEV GmbH, Aachen (DE)

( * ) Notice: Subject to any disclaimer, the term of this patent is extended or adjusted under 35 U.S.C. 154(b) by 0 days.

(21) Appl. No.: 15/397,269

(22) Filed: Jan. 3, 2017

(65) Prior Publication Data

US 2018/0187621 A1 Jul. 5, 2018

(51) Int. Cl.
| | |
|---|---|
| *F02D 41/14* | (2006.01) |
| *F02P 5/145* | (2006.01) |
| *F02D 41/00* | (2006.01) |
| *F02P 5/04* | (2006.01) |

(52) U.S. Cl.
CPC ....... *F02D 41/1487* (2013.01); *F02D 41/008* (2013.01); *F02D 41/1439* (2013.01); *F02D 41/1444* (2013.01); *F02P 5/045* (2013.01); *F02P 5/145* (2013.01); *F02D 2200/02* (2013.01)

(58) Field of Classification Search
CPC ............. F02D 41/1487; F02D 41/1444; F02D 41/008; F02D 41/1439; F02D 2200/02; F02P 5/045; F02P 5/145
See application file for complete search history.

(56) References Cited

U.S. PATENT DOCUMENTS

| | | | | |
|---|---|---|---|---|
| 8,447,502 B2* | 5/2013 | Rollinger | ............... | F02D 35/027 123/435 |
| 8,463,533 B2* | 6/2013 | Glugla | .................. | F02D 35/027 123/406.3 |
| 8,720,416 B2* | 5/2014 | Amann | .................. | F02D 35/028 123/406.44 |
| 9,038,596 B2 | 5/2015 | Glugla et al. | | |
| 9,869,262 B2* | 1/2018 | Haenel | ................ | F02D 41/1459 |
| 2005/0056254 A1* | 3/2005 | Wozniak | ............... | F02P 5/1525 123/406.13 |
| 2012/0048216 A1* | 3/2012 | Tomazic | ............ | F02M 25/0707 123/3 |
| 2013/0139786 A1* | 6/2013 | Glugla | ................ | F02D 41/0087 123/321 |
| 2015/0167573 A1 | 6/2015 | Glugla et al. | | |

(Continued)

FOREIGN PATENT DOCUMENTS

| | | |
|---|---|---|
| CN | 104564483 A | 4/2015 |
| EP | 0967390 B1 | 7/2007 |
| JP | 2011047281 A * | 3/2011 |

OTHER PUBLICATIONS

Ghimire, S. & Brandt, Dr. M.; Patentability Research; dated Jun. 20, 2016.

*Primary Examiner* — Joseph Dallo

(74) *Attorney, Agent, or Firm* — Dinsmore & Shohl LLP

(57) ABSTRACT

A process and a system for preventing pre-ignition in an internal combustion engine (ICE) includes detecting an ionization level of a combusted gas from a cylinder of the ICE during gas exchange and for a given combustion cycle i. When the ionization level is greater than a reference ionization level a pre-ignition countermeasure prior to and/or during an immediate subsequent combustion cycle i+1 is executed. The ionization sensor may be part of a spark initiating device of the ICE or be a separate ionization sensor.

19 Claims, 4 Drawing Sheets

(56) References Cited

U.S. PATENT DOCUMENTS

2015/0361914 A1\* 12/2015 Oka .................... F02D 13/0242
 123/90.15
2016/0146126 A1\* 5/2016 Glugla .................... F02D 13/06
 701/103
2016/0208723 A1 7/2016 Haenel et al.

\* cited by examiner

SYSTEM AND PROCESS FOR PREDICTING AND PREVENTING PRE-IGNITION

FIELD OF THE INVENTION

The present invention is related to a system and process for predicting and preventing pre-ignition in an internal combustion engine, and in particular preventing pre-ignition in an internal combustion engine using an ionization level from a combustion chamber of the internal combustion engine.

BACKGROUND OF THE INVENTION

The need for motor vehicles with improved fuel economy is known. As such, downsized engines with superchargers are currently being developed to provide improved fuel economy while maintaining customer-desired engine performance. Such downsized engines are also known to have relatively high pressures at low speeds with low speed pre-ignition (LSPI) being a problem that is currently preventing further downsizing and improved fuel economy. As such, a system and a process that predicts and prevents pre-ignition, and in particular LSPI, from occurring would be desirable.

SUMMARY OF THE INVENTION

A process and a system for preventing pre-ignition in an internal combustion engine (ICE) are provided. The process includes providing an ICE that has a combustion chamber and an exhaust. Also provided is an ionization sensor in communication with the combustion chamber, or in the alternative or in addition to, be in communication with an exhaust of the ICE. The ionization sensor is operable to detect ionization due to pre-reactions and/or oxidation reactions during gas exchange of the ICE and provide a corresponding ionization current to an electronic control unit (ECU).

The process further includes detecting ionization of pre-reactions and/or oxidation reactions for a given combustion cycle i during operation of the ICE and comparing the level of ionization (i.e., the ionization current) for the given combustion cycle i to a reference ionization level. When the ionization level for the given combustion cycle i is greater than or equal to the reference ionization level a pre-ignition countermeasure prior to and/or during an immediate subsequent combustion cycle i+1 is executed. Furthermore, the executed pre-ignition countermeasure prevents pre-ignition from occurring in the immediate subsequent combustion cycle i+1 of the ICE, and in some instances the following combustion cycle i+2, the next following combustion cycle i+3, and the like.

The ionization sensor can be included as part of a spark initiating device for a cylinder of the ICE, be included as part of a fuel injector for the combustion chamber of the ICE, be a dedicated (separate) ionization sensor in communication with the combustion chamber of the ICE, be an ionization sensor embedded within a head gasket of the ICE, or in the alternative or in addition to, be an ionization sensor included in the exhaust duct of the ICE. In addition, the pre-ignition countermeasure can be at least one of fuel enrichment of an air-fuel mixture injected into the combustion chamber, a fuel shut-off to the combustion chamber, altering timing of injecting an air-fuel mixture into the combustion chamber, altering timing of initiating a spark in the combustion chamber, altering air flow of air injected into the combustion chamber and injecting a suppressing agent/fluid that inhibits pre-ignition. In some instances, the selection of the at least one of the pre-ignition countermeasures is a function of how much greater the ionization level for the given combustion cycle i is than the reference ionization level. That is, the selection of the at least one of the pre-ignition countermeasures may be a function of the magnitude of the difference between the ionization level for the given combustion cycle i and the reference ionization level.

The reference ionization level can be a pre-set ionization reference value which may or may not change as a function of time. In embodiments, the ionization reference value changes as a function of operating patterns for the ICE, for example as a function of driver habits of a motor vehicle containing the ICE. As used herein, the term "driver habits" refers to driver characteristic vehicle speed and load requests as well as boundary conditions resulting from the vehicles location that result in a specific engine operation history.

It is appreciated that the ICE may have a plurality of combustion chambers and the ionization sensor can be a global ionization sensor that is operable to measure ionization levels for each of the plurality of combustion chambers. Stated differently, a single ionization sensor measures ionization from each of the plurality of combustion chambers. In some instances, the pre-ignition countermeasure is executed on a particular combustion chamber that the ionization sensor detects an ionization level that is greater than or equal to the reference ionization level. In other instances, the pre-ignition countermeasure is executed on a sub-set of the plurality of combustion chambers that include a particular combustion chamber that the ionization sensor detects an ionization level greater than or equal to the ionization reference level. In still other instances, the pre-ignition countermeasure is executed on all of the plurality of combustion chambers.

The system for preventing pre-ignition in the ICE includes a fuel and/or fuel-air injection system operable to inject a fuel-air mixture into the combustion chamber and an exhaust system operable for exhaust gas from the combustion chamber to exit and flow to an outlet. The ICE also has an air flow system which provides for air to flow into the combustion chamber. The ICE can optionally include a spark initiating system that initiates one or more a sparks within each combustion chamber at a desired time.

The ionization sensor in communication with the combustion chamber is operable to detect an ionization level from the combustion chamber for at least one combustion cycle i thereof. An engine control unit (ECU) is included and in communication with the fuel-air injection system, the air flow system, and/or the spark initiating system. In addition, the ECU is operable to initiate at least one pre-ignition countermeasure before a subsequent combustion cycle i+1 when the ionization sensor detects an exhaust ionization level in an immediately previous combustion cycle i that is greater than or equal to a pre-set ionization reference value. Initiation and execution of the pre-ignition countermeasure prevents pre-ignition in the combustion chamber during the subsequent combustion cycle i+1. It is appreciated that without initiation and execution of the at least one pre-ignition countermeasure, the combustion chamber exhibits a pre-ignition event. In some instances, the ICE is a downsized turbocharged or supercharger engine and the at least one pre-ignition countermeasure initiated by the ECU prevents low speed pre-ignition by the downsized engine.

DETAILED DESCRIPTION OF THE INVENTION

Figure 1:
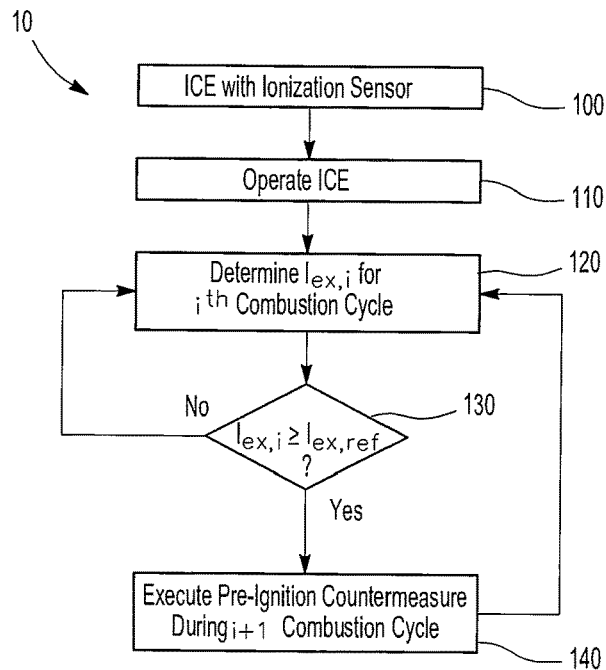
FIG. 1 is a schematic illustration of a process according to an embodiment disclosed herein.

A process and a system for preventing pre-ignition in an internal combustion engine (ICE) are provided. The process and system use an ionization sensor to determine an ionization level of combusted during gas exchange generated in a combustion chamber of an ICE for a given combustion cycle i. As used herein, the term "gas exchange" refers to the intake exhaust stroke in an ICE.

An ionization level for the given combustion cycle i ($I_{ex,i}$) is compared with a reference gas exchange ionization level ($I_{ex,ref}$). If the ionization level for the given combustion cycle i is greater than or equal to $I_{ex,ref}$ a pre-ignition countermeasure is executed prior to and/or during an immediate subsequent combustion cycle i+1 and the executed pre-ignition countermeasure prevents pre-ignition from occurring in the immediate subsequent combustion cycle i+1 of the ICE. In this manner, pre-ignition is prevented before occurring instead of attempting to stop future pre-ignition events once an initial pre-ignition event has occurred as in prior art methods and systems.

The process and system both include an ICE with a combustion chamber, and in some instances a plurality of combustion chambers. The combustion chamber or the plurality of combustion chambers have an exhaust that is operable for combusted gas from the combustion chamber to flow there through to an outlet of the exhaust. An ionization sensor is in communication with the combustion chamber and is operable to detect ionization generated in the combustion chamber due to pre-reactions and/or oxidation reactions during gas exchange. The ionization sensor can be in a main exhaust line, or in the alternative in a single runner of an exhaust manifold or a single exit pathway of an exhaust manifold. The ionization can also be in a combustion chamber or one of a plurality of combustion chambers. Also more than one ionization sensor can be included and be present in a subset of runners within an exhaust manifold, all of the runners in an exhaust manifold, in a subset of a plurality of combustion chambers and/or all of a plurality of combustion chambers.

The ionization sensor senses the ionization level from the one or more combustion chambers for a given combustion cycle i during operation of the ICE. In some instances, and in the case that the ICE has a plurality of combustion chambers, the ionization sensor can detect an ionization level due to pre-reactions and/or oxidation reactions for each combustion chamber. In addition, the ionization level for each combustion chamber and for a given combustion cycle i is compared to $I_{ex,ref}$ and in the event the ionization level is greater than or equal to $I_{ex,ref}$ a pre-ignition countermeasure can be executed prior to and/or during an immediate subsequent combustion cycle i+1. In some instances, the pre-ignition countermeasure is executed with respect to a single combustion chamber in which the ionization level $I_{ex,i}$ is greater than or equal to $I_{ex,ref}$. In other instances, the pre-ignition countermeasure is executed with respect to a sub-set of combustion chambers that contain a combustion chamber in which the ionization level $I_{ex,i}$ is greater than or equal to $I_{ex,ref}$. In still another alternative, the pre-ignition countermeasure is executed for all of the combustion chambers.

Any pre-ignition countermeasure that prevents pre-ignition from occurring in a given combustion chamber can be executed. Exemplary pre-ignition countermeasures include fuel enrichment of an air-fuel mixture injected into the combustion chamber, a fuel shut-off to the combustion chamber, altering timing of injecting an air-fuel mixture into the combustion chamber, altering timing of initiating a spark in the combustion chamber, altering air flow of air injected into the combustion chamber and injecting a suppressing agent/fluid that inhibits pre-ignition.

The selection of one or more pre-ignition countermeasures can be a function of the detected or measured ionization level. Stated differently, depending upon the magnitude or absolute difference between the detected or measured ionization level $I_{ex,i}$ and $I_{ex,ref}$, a particular pre-ignition countermeasure is executed, or in the alternative, more than one desired pre-ignition countermeasure is executed. In embodiments, the $I_{ex,ref}$ can be a pre-set value that does not change with time. In other embodiments, the $I_{ex,ref}$ can change as a function of time, e.g. as a function of operating patterns for the ICE. As used herein, the term "operating pattern" or "operating patterns" refers to the way the engine is operated to fulfill a request set by a driver or a control unit under specific environmental and boundary conditions.

Turning now to FIG. 1, an embodiment of a process for preventing pre-ignition in an ICE is shown generally at reference numeral 10. The process 10 includes providing an ICE with an ionization sensor at step 100 and operating the ICE at step 110. The ionization sensor detects the ionization level (i.e., ionization current) due to pre-reactions and/or oxidation reactions during gas exchange for a given combustion cycle i ($I_{ex,i}$) at step 120 and $I_{ex,i}$ is compared with a reference ionization level ($I_{ex,ref}$) at step 130. If $I_{ex,i}$ is not greater than or equal to $I_{ex,ref}$ the process returns back to step 120 and repeats itself. In the alternative, if $I_{ex,i}$ is determined to be greater than or equal to $I_{ex,ref}$ at step 130, then a pre-ignition countermeasure is executed before or during the i+1 combustion cycle at step 140. It is appreciated that execution of the pre-ignition countermeasure at step 140 prevents pre-ignition during the i+1 combustion cycle. After the execution of the pre-ignition countermeasure, the process returns back to step 120 where the ionization sensor detects the ionization level for subsequent combustion cycles. It is appreciated that the ionization sensor can continually monitor ionization levels due to pre-reactions and/or oxidation reactions, e.g., during gas exchange, for a combustion chamber during operation of the ICE. In addition, it is also appreciated that the ionization sensor can be an ionization sensor that detects ionization levels ($I_{ex,i}$) which are compared with a reference ionization level ($I_{ex,ref}$)

Figure 2:
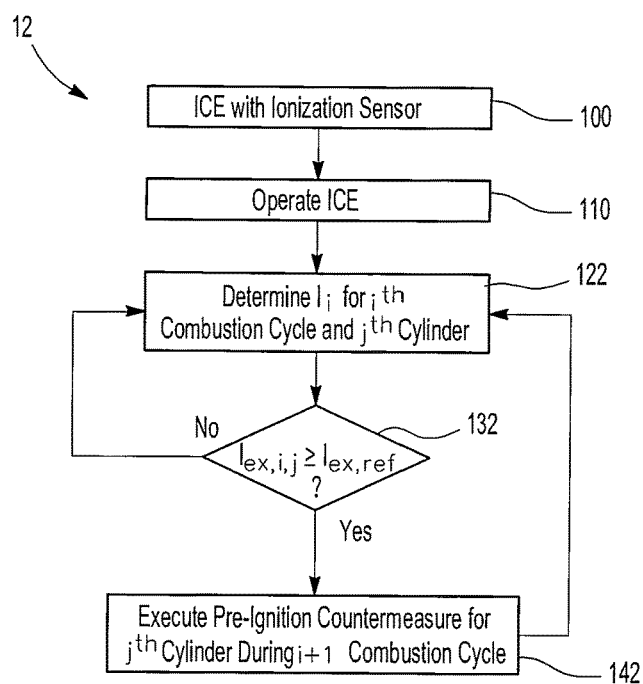
FIG. 2 is a schematic illustration of a process according to another embodiment disclosed herein.

With reference to FIG. 2, another process according to an embodiment disclosed herein is shown generally at reference numeral 12. This process includes providing the ICE with the ionization sensor at step 100, however the ICE has a plurality of combustion chambers. At step 110, the ICE is operated and at step 122 the ionization level due to pre-reactions and/or oxidation reactions during gas exchange for a given combustion cycle i and a given cylinder j ($I_{ex,i,j}$) is determined. A comparison of $I_{ex,i,j}$ with $I_{ex,ref}$ is performed at step 132. In the event that the $I_{ex,i,j}$ is not greater than or equal to $I_{ex,ref}$ the process returns to step 122. It is appreciated that one or more ionization sensors may detect the ionization level for each of the cylinders of the ICE during each given combustion cycle. In addition, it is also appreciated that the one or more of the ionization sensors may be one or more ionization sensors that determine $I_{ex,i,j}$ which is compared with $I_{ex,ref}$.

In the event that the $I_{ex,i,j}$ is greater than or equal to the $I_{ex,ref}$, a pre-ignition countermeasure for the given cylinder j is executed before and/or during the next combustion cycle i+1 at step 142. After execution of the pre-ignition countermeasure, the process returns to step 122 where the ionization sensor continues to determine ionization levels for one or more cylinders in subsequent combustion cycles. The execution of the pre-ignition countermeasure for the given cylinder j prevents pre-ignition in the subsequent combustion cycle i+1, and in some instances in the following combustion cycle i+2, the next following combustion cycle i+3, and the like.

Figure 3:
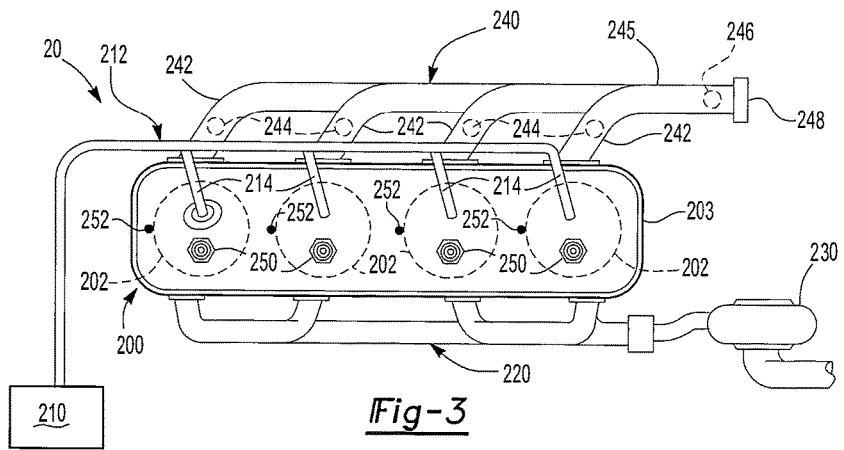
FIG. 3 is a schematic illustration of a system according to an embodiment described herein.

Regarding a system that prevents pre-ignition, FIG. 3 provides an embodiment of a system according to an embodiment disclosed herein at reference numeral 20. The system 20 includes a downsized ICE 200 with a plurality of cylinders 202 within a cylinder block 203. It is appreciated that pistons (not shown) slide up and down within the cylinders 202 as is known to those skilled in the art. The system 20 includes a fuel tank 210 and a fuel delivery system 212 that delivers fuel into each of the cylinders 202. The fuel delivery system 212 can be a fuel injection system with individual fuel injectors 214 that afford for the injection of fuel into the cylinders 202. In some instances, the fuel injectors 214 can be direct fuel injectors.

The system 20 also includes an air intake system 220 and optionally a supercharger or turbocharger 230. Air passing through the air intake system 220 passes through one or more valves (not shown) into each of the cylinders 202. The air may be supercharged through the supercharger or turbocharger 230. The system further includes an exhaust system 240 with exhaust runners 242 from each of the cylinders 202 allowing for gas exchange, i.e., the passage of exhaust gas from the cylinders to a main exhaust line 245. Also, the system 20 may or may not include spark initiating devices 250, e.g. spark plugs. Stated differently, the ICE 200 can be a gasoline powered engine, an engine that uses ethanol blends, compressed natural gas (CNG), etc., or, in the alternative, a compression ignition engine such as a diesel engine.

In communication with the plurality of cylinders 202 is at least one ionization sensor. In embodiments, the at least one ionization sensor may be part of the spark initiating devices 250, i.e., the one or more spark initiating devices 250 are configured to detect and measure an ionization level due to pre-reactions and/or oxidation reactions during gas exchange for at least one of the cylinders 202. In some instances, each of the spark initiating devices includes an ionization sensor. In other embodiments, one or more separate ionization sensors 252 (i.e., separate from the spark initiating device 250) are included and are configured to detect and measure an ionization level due to pre-reactions and/or oxidation reactions during gas exchange for at least one of the cylinders 202. For example and without limitation the one or more ionization sensors 252 may be embedded in a head gasket 253 of the ICE or may be a dedicated ionization sensor 252 installed in a cylinder head and in communication with at least one of the cylinders 202. In still other embodiments, each of the exhaust manifolds 242 may include an ionization sensor 244, and in the alternative or in addition to, a single ionization sensor 246 may be located in or be in communication with the main exhaust line 245. In operation, air and fuel are injected into each of the cylinders 202 and combustion or burning of the air-fuel mixture results in combusted gas being generated and passing through each of the exhaust headers 242 to the main exhaust line or pipe 245 and to an outlet 248. In addition, the one or more ionization sensors that are part of the spark initiating devices 250, one or more ionization sensors 252 and/or one or more ionization sensors 244 may monitor the ionization levels in the exhaust gas during gas exchange from each cylinder 202. In the alternative or in addition to, the single ionization sensor 246 can monitor the ionization level for each cylinder 202. In another alternative, the single ionization sensor 246 measures a global or overall ionization level from all of the cylinders 202.

Figure 5:
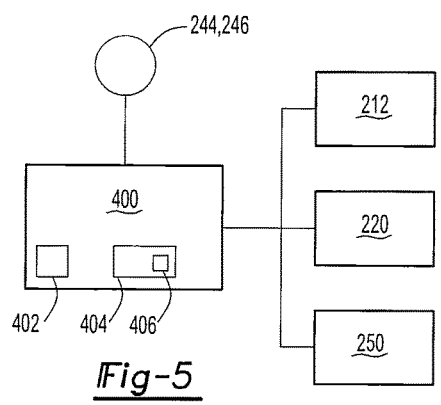
FIG. 5 is a schematic illustration of an engine control unit (ECU) in communication with an ionization sensor, a fuel injection system, an air flow system, and a spark initiating system.

The one or more ionization sensors that are part of the spark initiating devices 250, one or more ionization sensors 252, one or more ionization sensors 244 and/or the single ionization sensor 246 is in communication with an engine control unit (ECU) 400 as shown in FIG. 5. The ECU 400 is also in communication with the fuel delivery system 212, the air intake system 220, and optionally the spark initiating system 250. The ECU 400 is operable to receive a signal from one or more Ionization sensors and determine if a sensed or measured ionization level for a given combustion cycle is greater than or equal to a stored $I_{ex,ref}$. In the event that one or more ionization levels from the cylinders 202 for a given combustion cycle is not greater than or equal to the stored $I_{ex,ref}$, then no action is taken with respect to a pre-ignition countermeasure. However, if one or more of the ionization levels form the cylinders 202 for a given combustion cycle is greater than $I_{ex,ref}$ then the ECU 400 initiates a pre-ignition countermeasure which is executed by one or more of the fuel delivery system 212, air intake system 220, and/or spark initiating system 250. Furthermore, depending on the magnitude of the level, which particular pre-ignition countermeasure or combination of pre-ignition countermeasures that is/are initiated and executed may be selected.

Figure 4:
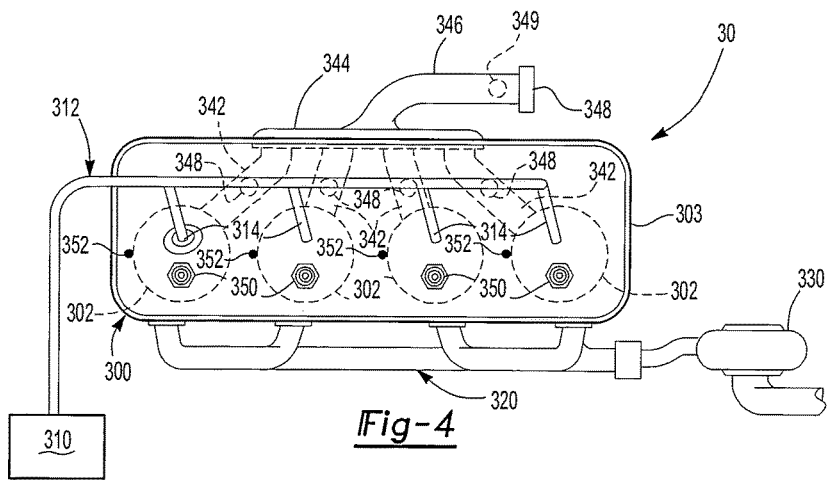
FIG. 4 is a schematic illustration of another system according to an embodiment disclosed herein.

With reference to FIG. 4, another embodiment of a system that prevents pre-ignition is shown at reference numeral 30. The system 30 includes a downsized ICE 300 with an air intake system 320 and a supercharger or turbocharger 330. The engine 300 includes a plurality of cylinders 302 within a cylinder block 303 as is known to those skilled in the art. The system 30 also includes a fuel tank 310 and a fuel delivery system 312 with a fuel injector 314 for each of the cylinders 302. The fuel injectors 302 may be direct fuel injectors, however this is not required. The ICE 300 has a short header system with exhaust headers 342 within the cylinder block 303. The exhaust headers 342 from each cylinder 302 lead to an exhaust manifold 344 which is in communication with a main exhaust line/pipe 346. Optional spark initiating devices 350 can be in communication with the cylinder and provide a spark during operation of the engine 300 as is known to those skilled in the art.

During operation, air passes through the supercharger or turbocharger 330, passes through the air intake system 320, and into the cylinders 302. In addition, fuel from the fuel tank 310 is delivered by the fuel delivery system 312 into the cylinders 302. A fuel-air mixture provided to each cylinder 302 is combusted, the combustion of which generates exhaust gas which passes from each cylinder 302 during gas exchange, through the headers 342, the manifold 344, the exhaust line/pipe 346 and finally to an outlet 348.

Similar to embodiment 20 discussed above, one or more ionization sensors are included. For example, one or more ionization sensors may be part of the spark initiating devices 350, one or more separate ionization sensors 352 proximate the cylinders 302 included, one or more ionization sensor 348 positioned in each header 342 and/or a single ionization sensor 349 positioned in the exhaust manifold 346.

During operation of the system 30 the ionization sensors monitor ionization levels in the exhaust gas during gas exchange from one or more of the cylinders 302. Similar to the embodiment shown in FIG. 3, the one or more ionization sensors that are part of the spark initiating devices 350, one or more ionization sensors 352, one or more ionization sensor 348 and/or the single ionization sensor 349 detect and transmit ionization level(s) to the ECU 400 illustrated in FIG. 5. When an ionization level is equal to or greater than an ionization reference value, the ECU 400 may initiate one or more pre-ignition countermeasures prior to and/or during a subsequent combustion cycle. In addition, the fuel delivery system 312, air intake system 320 and/or spark initiating devices 350 executes one or more of the initiated pre-ignition countermeasures. It is appreciated that a pre-ignition countermeasure in the form of injection of a suppressing agent/fluid that inhibits pre-ignition can be executed. Furthermore, the ECU 400 can include a control unit 402 and memory 404 with a software module 406 such that a learning function based on whether or not a pre-ignition event was detected and thus if a countermeasure was successful. For example and for illustrative purposes only, the ECU 400 can be in communication with a knock sensor (not shown) and thereby can receive closed loop feedback as to if one or more countermeasures were successful, if ageing effects are present, etc. Also, the learning function can adjust a level of a given countermeasure, selection of a countermeasure and the like, based on the closed loop feedback.

Figure 6:
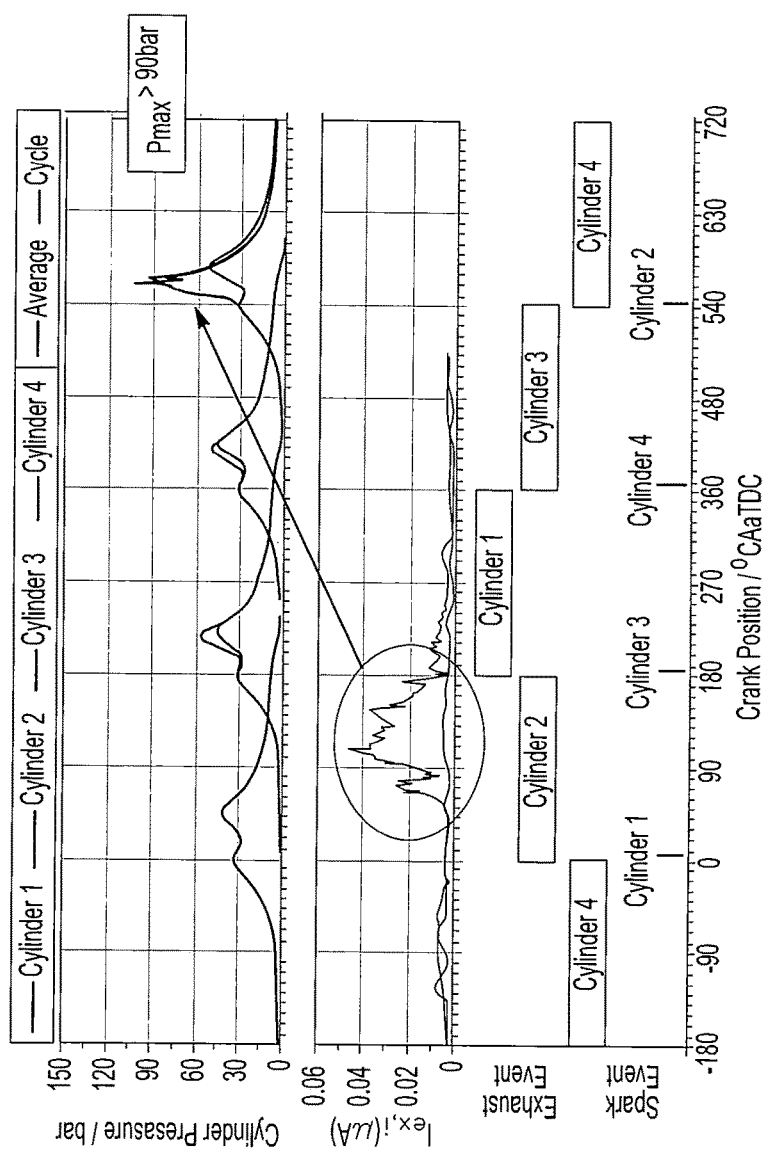
FIG. 6 is a graphical plot of spark event, exhaust event, ionization level, and cylinder pressure as a function of crank position for a four cylinder internal combustion engine.

Turning now to FIG. 6, the detection of an ionization level for a given cylinder of an ICE is depicted. Particularly, four separate graphical outputs are shown as a function of crank angle in FIG. 6 with the bottom graph depicting a spark event for each of the cylinders. The next graph (immediately above the bottom graph) depicts an exhaust event (gas exchange) for each cylinder and a measure of ionization current for each cylinder for a given combustion cycle i is depicted in the next graph (immediately above the exhaust event graph). Finally, a cylinder pressure for each cylinder during the next combustion cycle i+1 is shown in the top graph. As shown in FIG. 6, cylinder 2 demonstrates a relatively high ionization level of approximately 0.04 microamperes (µA) for the given combustion cycle i. In addition, cylinder 2 exhibited a pre-ignition event with a pressure greater than 90 bar during the next subsequent combustion cycle i+1.

Figure 7:
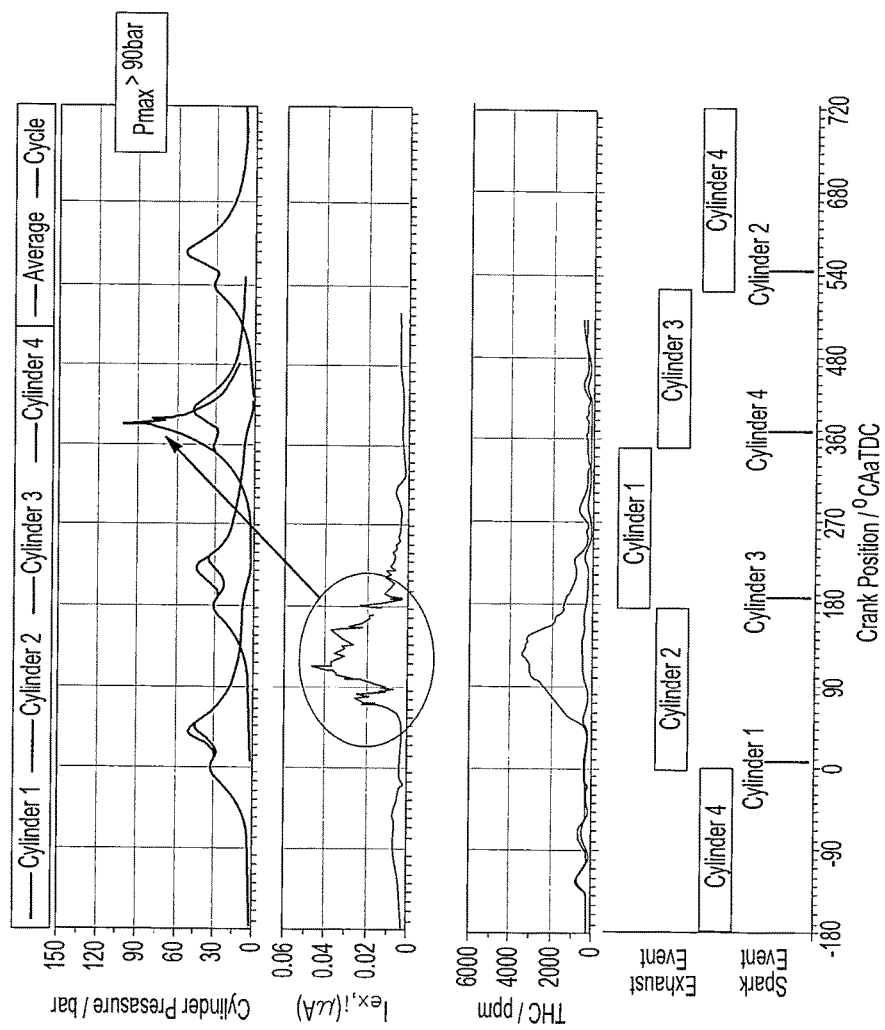
FIG. 7 is another graphical plot of spark event, exhaust event, THC level, ionization level and cylinder pressure as a function of crank position for a four cylinder internal combustion engine.

Another example of such an event is shown in FIG. 7 with five separate graphical outputs a function of crank angle depicted along the X and Y axes. Starting at the bottom of the y-axis and moving upward, the first and lowest graphical output is a spark event for each of the cylinders. Next, an exhaust event for each cylinder is shown, then a measure of total hydrocarbon (THC) level for each cylinder, and then an ionization level for each cylinder for a given combustion cycle i. Finally cylinder pressure for each cylinder during the next combustion cycle i+1 is shown. As depicted in FIG. 7, cylinder 2 demonstrates a relatively high ionization level of approximately 0.04 µA for the given combustion cycle i, followed by a pre-ignition event in cylinder 2 with a pressure greater than 90 bar during the next subsequent combustion cycle i+1. Also, cylinder 2 demonstrated a relatively high THC level of approximately 3500 ppm which may be associated with the relatively high ionization level for the gas exchange. That is, it is understood that ionization from pre-reactions and/or oxidation reactions associated with high levels of THC in the gas exchange may result in the relatively high ionization levels during the gas exchange. As such, FIGS. 6 and 7 illustrate that a pre-ignition event in combustion cycle i+1 that can be harmful to an ICE is preceded in an immediately prior combustion cycle i with a relatively high ionization level. In addition, the pre-ignition event for a particular cylinder j during a combustion cycle i+1 is preceded by the high ionization level in cylinder j during the immediately preceding combustion cycle i. Therefore, the use of a ionization sensor as disclosed herein can predict a pre-ignition event during the next subsequent combustion cycle i+1. Also, such a pre-ignition event is prevented by the initiation and execution of one or more pre-ignition countermeasures as discussed above.

For example and for illustrative purposes only, and with reference to FIGS. 2 and 6, an ICE with one or more ionization sensors monitors ionization levels for each of the engine cylinders during gas exchange. Upon detecting an ionization level for a particular cylinder j and during a given combustion cycle i that is higher than $I_{ex,ref}$, a pre-ignition countermeasure is initiated and executed for or within that particular cylinder j prior to and/or during the next subsequent combustion cycle i+1. As noted above, at least one pre-ignition countermeasure such as providing a fuel enrichment of an air-fuel mixture injected into the cylinder, providing a fuel shut-off to the cylinder, altering timing of injecting an air-fuel mixture injected into the cylinder, altering timing of initiating a spark in the cylinder, altering air flow of air injected into the cylinder and/or injecting a suppressing agent/fluid into the cylinder can be performed. It is appreciated that altering the air flow can include manipulation of one or more intake air valves and/or one or more exhaust air valves.

In this manner, and as disclosed herein, monitoring of ionization levels within an ICE predicts future pre-ignition events which are subsequently prevented by the initiation and execution of pre-ignition countermeasures.

It is appreciated that the embodiments, examples, etc. disclosed herein are not limiting in their scope of the invention. Changes, modifications, etc. will be apparent to those skilled in the art and yet still fall within the scope of the invention. As such, it is the claims, and all equivalents thereof, that define the scope of the invention.

I claim:

1. A process for preventing pre-ignition in an internal combustion engine (ICE), the process comprising:
    detecting an ionization level from at least one of a combustion chamber and an exhaust of an ICE during a gas exchange for a given combustion cycle i ($I_{ex,i}$) using an ionization sensor in communication with the combustion chamber;
    comparing in an electronic control unit the $I_{ex,i}$ for the given combustion cycle to a reference ionization level ($I_{ex,ref}$); and
    executing a pre-ignition countermeasure prior to an immediate subsequent combustion cycle (i+1) when $I_{ex,i}$ is greater than or equal to $I_{ex,ref}$ ($I_{ex,i} \geq I_{ex,ref}$), the executed pre-ignition countermeasure preventing pre-ignition from occurring in the immediate subsequent i+1 combustion cycle of the ICE.

2. The process of claim 1, wherein the ionization sensor is selected from the group consisting of a spark initiating device including the ionization sensor, a fuel injector including the ionization SENSOR, an ionization sensor embedded in a head gasket of the ICE and an ionization sensor positioned in an exhaust of the ICE.

3. The process of claim 1, further comprising an electronic control unit (ECU) comparing the $I_{ex,I}$ for the given combustion cycle to a reference ionization level ($I_{ex,ref}$), and executing the pre-ignition countermeasure prior to the immediate subsequent combustion cycle (i+1) when $l_{ex,I}$ is greater than or equal to $I_{ex,ref}$ ($I_{ex,i} \geq I_{ex,ref}$), wherein the executed pre-ignition countermeasure prevents pre-ignition from occurring in the immediate subsequent i+1 combustion cycle of the ICE.

4. The process of claim 1 wherein the pre-ignition countermeasure is at least one of fuel enrichment of an air-fuel mixture injected into the combustion chamber, a fuel-shut-off to the combustion chamber, altering timing of injecting an air-fuel mixture into the combustion chamber, altering timing of initiating a spark in the combustion chamber, altering air flow of air injected into the combustion chamber and injecting a suppressing agent/fluid into the combustion chamber.

5. The process of claim 4, wherein the selection of at least one of the pre-ignition countermeasures is a function of a magnitude of a difference between greater $I_{ex,i}$ and $I_{ex,ref}$.

6. The process of claim 1, wherein $I_{ex,ref}$ is a pre-set ionization value.

7. The process of claim 1, wherein $I_{ex,ref}$ changes as a function of time.

8. The process of claim 1, wherein $I_{ex,ref}$ changes as a function of an operating pattern for the ICE.

9. The process of claim 8, wherein the operating pattern is a function of driver habits for a driver operating the ICE.

10. The process of claim 1, wherein the ICE has a plurality of combustion chambers.

11. The process of claim 10, wherein the ionization sensor is a global ionization sensor configured to measure exhaust ionization levels for each of the plurality of combustion chambers.

12. The process of claim 10, wherein the pre-ignition countermeasure is executed on a particular combustion chamber that the ionization sensor senses the ionization level $I_{ex,i}$ is greater than $I_{ex,ref}$.

13. The process of claim 10, wherein the pre-ignition countermeasure is executed on a sub-set of the plurality of combustion chambers that include a particular combustion chamber that the ionization sensor senses an $I_{ex,ref,i}$ level greater than $I_{ex,ref}$.

14. The process of claim 10, wherein the pre-ignition countermeasure is executed on all of the plurality of combustion chambers.

15. A system for preventing pre-ignition in an internal combustion engine (ICE), said system comprising:
   an ICE having a combustion chamber, a fuel-air injection system operable to inject a fuel-air mixture into said combustion chamber and an exhaust system operable for exhaust gas from said combustion chamber to exit and flow to an outlet;
   an ionization sensor in communication with said combustion chamber, said ionization sensor configured to detect an ionization level of an exhaust gas from said combustion chamber during gas exchange for at least one combustion cycle thereof; and
   an engine control unit (ECU) in communication with said fuel-air injection system and operable to control said fuel-air injection system and initiate at least one pre-ignition countermeasure;
   said ECU configured to initiate said at least one pre-ignition countermeasure before an i+1 combustion cycle when said ionization sensor detects an exhaust ionization level in a previous combustion cycle i ($I_{ex,i}$) that is greater than or equal to a pre-set ionization reference value ($I_{ex,ref}$) ($I_{ex,i} \geq I_{ex,ref}$) said initiation of said pre-ignition countermeasure preventing pre-ignition in said combustion chamber during said i+1 combustion cycle.

16. The system of claim 15, wherein said at least one pre-ignition countermeasure is at least one of fuel enrichment of an air-fuel mixture injected into said combustion chamber, a fuel shut-off to said combustion chamber, altering timing of injecting an air-fuel mixture into said combustion chamber, altering air flow of air injected into the combustion chamber and injecting a suppressing agent/fluid into the combustion chamber.

17. The system of claim 15, further comprising a spark initiating device operable to initiate a spark into said combustion chamber, wherein said at least one pre-ignition countermeasure comprises altering timing of initiating said spark into said combustion chamber.

18. The system of claim 15, wherein said ICE has a plurality of combustion chambers and said ionization sensor is in communication with said plurality of combustion chambers and is configured to detect said ionization level during gas exchange from each combustion chamber for at least one combustion cycle of each combustion chamber.

19. The system of claim 15, wherein said at least one pre-ignition countermeasure initiated by said ECU prevents low speed pre-ignition (LSPI) by said ICE.

* * * * *